(12) United States Patent
Jesen et al.

(10) Patent No.: US 12,331,962 B1
(45) Date of Patent: Jun. 17, 2025

(54) GAS CONDENSATE RECOVERY AND FLARE GAS COMBUSTION COMBINED CYCLE

(71) Applicant: Schlumberger Technology Corporation, Sugar Land, TX (US)

(72) Inventors: Marcus Jesen, New Plymouth (NZ); Glen Andrew Hay, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/664,482

(22) Filed: May 15, 2024

(51) Int. Cl.
*F24S 60/30* (2018.01)
*F24S 10/95* (2018.01)
*F24S 20/20* (2018.01)

(52) U.S. Cl.
CPC ............ *F24S 60/30* (2018.05); *F24S 10/95* (2018.05); *F24S 20/20* (2018.05)

(58) Field of Classification Search
CPC .. F24S 20/30; F24S 20/20; F24S 60/30; F24S 10/95
USPC .......................................... 126/639; 431/202
See application file for complete search history.

(56) References Cited

U.S. PATENT DOCUMENTS

| | | | |
|---|---|---|---|
| 2015/0075071 A1* | 3/2015 | Williams | C10J 3/726 48/209 |
| 2016/0146061 A1* | 5/2016 | Kalra | F28D 20/00 60/671 |
| 2023/0138866 A1* | 5/2023 | Han | F25J 1/0234 205/637 |

OTHER PUBLICATIONS

"Flare Gas To Power Project Enables Operator To Maximise Oil Production", Aggreko, downloaded on Nov. 27, 2024, from the internet [https://www.aggreko.com/en-nz/case-studies/oil-and-gas/flare-gas-to-power-enables-operator-to-maximise-oil-production], 11 Pages.
"Flare Gas Recovery System" GTUIT downloaded on Dec. 4, 2024, from [https://gtuit.com/flare-capture/], 12 pages.

* cited by examiner

*Primary Examiner* — Vivek K Shirsat
(74) *Attorney, Agent, or Firm* — Stephen M. Cordes

(57) ABSTRACT

A system may include a hot energy storage (HES). A system may include a cold energy storage (CES). A system may include an extraction condenser, wherein the extraction condenser receives coolth from the CES and is configured to condense at least a portion of a flare gas stream exiting a wellbore to produce a dry flare gas. A system may include a combustion generator configured to produce electrical power and combustion generator heat by combusting at least one portion of the dry flare gas or a derivative thereof and configured to provide the combustion generator heat to the HES. A system may include a thermodynamic cycle generator including a generator working fluid and configured to produce electrical power, and wherein the generator working fluid receives heat from the HES.

20 Claims, 9 Drawing Sheets

GAS CONDENSATE RECOVERY AND FLARE GAS COMBUSTION COMBINED CYCLE

CROSS-REFERENCE TO RELATED APPLICATIONS

N/A.

BACKGROUND

Renewable energy usage is growing rapidly all the over the world as humanity tries to decarbonize sources of energy. However, the two most common forms of renewable energy, solar and wind, are intermittent. For these sources to provide a steady amount of energy throughout the day, energy storage is required. Thermal energy storage allows waste heat from solar energy to provide an additional energy production stream.

SUMMARY

In some aspects, the techniques described herein relate to a system for providing electrical power, the system including: a hot energy storage (HES); a cold energy storage (CES); an extraction condenser, wherein the extraction condenser receives coolth from the CES and is configured to condense at least a portion of a flare gas stream exiting a wellbore to produce a dry flare gas; a combustion generator configured to produce electrical power and combustion generator heat by combusting at least one portion of the dry flare gas or a derivative thereof and configured to provide the combustion generator heat to the HES; a thermodynamic cycle generator including a generator working fluid and configured to produce thermodynamic cycle electrical power, and wherein the generator working fluid receives heat from the HES.

In some aspects, the techniques described herein relate to a method of providing electrical power, the method including: combusting dry flare gas at a combustion generator to produce combustion generator heat and combustion generator electrical power; heating a generator working fluid with the combustion generator heat; generating thermodynamic cycle electrical power in a thermodynamic cycle generator with the generator working fluid; and cooling the generator working fluid with coolth from a chiller at least partially powered by the combustion generator electrical power.

In some aspects, the techniques described herein relate to a system for providing electrical power, the system including: a hot energy storage (HES); a cold energy storage (CES); a combustion generator configured to produce combustion generator electrical power and combustion generator heat by combusting at least one portion of a dry flare gas or a derivative thereof and configured to provide the combustion generator heat to the HES; a chiller configured to receive combustion generator electrical power and cool the CES; and a thermodynamic cycle generator including a generator working fluid and configured to produce thermodynamic cycle electrical power, wherein the generator working fluid receives heat from the HES and receives coolth from the CES.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which.

DETAILED DESCRIPTION

Figure 1:
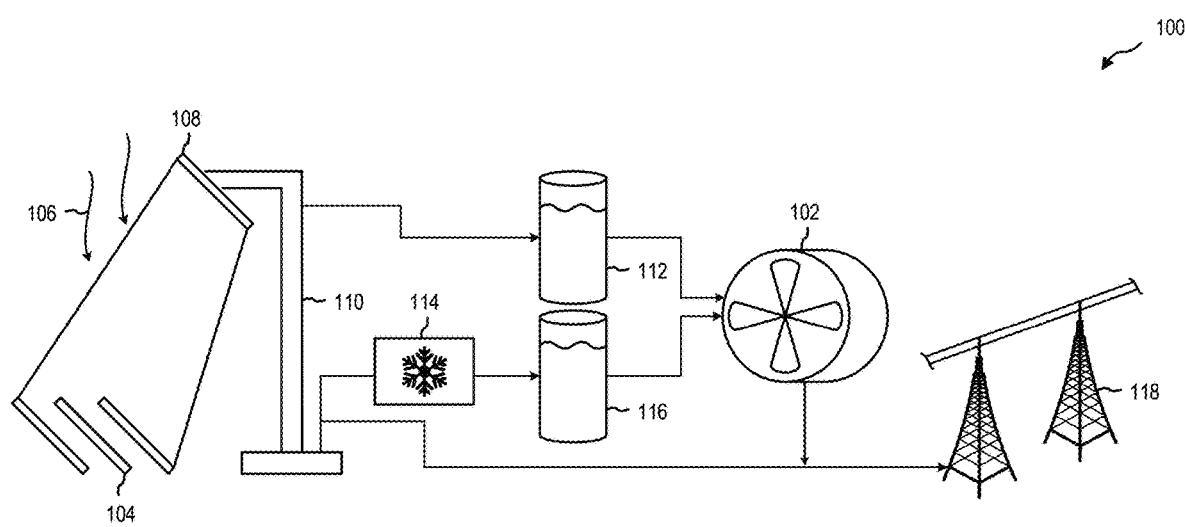
FIG. 1 illustrates such an example of a system 100 including a thermodynamic cycle generator, according to at least some embodiments of the present disclosure.

Embodiments of the present disclosure generally relate to energy storage and production. Many renewable energy sources produce intermittent energy, such as solar energy production that is greatest during full sun, less during overcast skies, and near zero during night. Short-term energy storage is storage of energy (thermal, mechanical, electrical, chemical, etc.) for no more than 4 hours of time. For example, lithium-ion batteries, on a large scale, become economically unviable for storage durations of greater than 4 hours. Lithium-ion batteries are generally used for short-term energy storage. In some embodiments, intermediate-term and/or long-term storage is needed to maintain a power supply through the night or during unfavorable weather when solar or wind power produces insufficient quantities of electrical power.

Other forms of energy storage can be more economical on intermediate-term and/or long-term scales. For example, pumped hydrological energy storage allows for the conversion of available energy (such as during periods of sunlight or wind) to gravitational potential energy of a mass of water that is pumped vertically upward, such as to a reservoir uphill or into a tower. Thermal energy storage stores energy as heat and converts a temperature difference to energy through a thermodynamic cycle, such as a Rankine cycle. The thermal energy storage is, in some embodiments, further used to condense and extract combustible gases as liquids for long-term energy storage and/or sale.

In some embodiments, a system for providing electrical power includes a high-temperature heat source, a low-temperature heat sink, a thermodynamic cycle generator, a solar thermal collector, and a gas condenser. The generator includes a generator working fluid with a boiling temperature greater than a low temperature of the low-temperature heat sink, and the generator working fluid receives heat from the high-temperature heat source and exhausts heat, evaporating and driving a turbine in rotation that produces electricity. The low temperature heat sink is used to condense the working fluid downstream of the turbine. Such generator works using a thermodynamic cycle, such as a Rankine cycle. The solar thermal collector is in thermal communication with the high-temperature heat source to heat the high-temperature heat source. The solar thermal collector includes a photovoltaic (PV) module, and the solar thermal collector is configured to convert a first portion of sunlight to thermal energy and a second portion of the sunlight to electrical energy. A chiller cools the low temperature heat sink using electrical energy provided by the PV module(s) and/or the generator. The low-temperature heat sink, in some embodiments, further cools a gas condenser to condense and extract one or more flare feed gases or other commodity gas condensates from a well.

In some embodiments, systems and methods according to the present disclosure use thermodynamic cycle, such as an organic Rankine cycle (ORC), to convert a temperature difference into energy. The generator uses a difference in temperature to drive a heat-to-power engine through the expansion of a generator working fluid. This engine may be used to provide power to the grid when solar modules are unable to generate power (at nighttime or on cloudy days) or wind turbines are unable to turn. For example, a generator working fluid has a boiling temperature (and condensation temperature) less than the boiling temperature of water of 100° C. (at one atmosphere pressure), if that is chosen as the hot storage source temperature. In some examples, the generator working fluid is liquid at ambient temperature (and pressure) and boils at a temperature less than the boiling temperature of water (at ambient pressure). The working fluid might be for instance ammonia.

A generator converts a temperature differential between a high temperature heat source and a low-temperature heat sink into mechanical energy, which may be converted to electrical energy and exported to a power grid or stored in another form of energy storage, such as a short-term, or long-term battery storage device. For example, the thermal storage may use a first mass of fluid, such as water, that is heated (for the high temperature heat source) and a second mass of fluid, such as water, that is cooled (for the low-temperature heat sink). For example, a high temperature thermal storage or heat source is maintained at or near the boiling temperature of water (or other fluid) and a low-temperature thermal storage is stored at or near the freezing temperature of water (or other fluid), such as in an ice slurry. In such examples, the temperature difference between the hot water and cold water storage is, therefore, at or near a maximum at atmospheric pressure.

FIG. 1 illustrates such an example of a system 100 including a thermodynamic cycle generator 102, such as a Rankine cycle generator, Kalina cycle generator, etc. Such a system associates the thermodynamic cycle generator with a solar energy harvesting system. One or more mirrors 104 direct sunlight 106 onto a solar thermal collector, such as raised photovoltaic (PV) modules 108 supported by a PV module tower 110, that are actively cooled by a coolant (such as water) circulated through the PV module tower 110. The PV modules 108 convert the sunlight 106 to energy with approximately 90% efficiency, with about 30% of the sunlight energy converted to electrical power by the PV modules 108 and about 60% converted to heat. The heat is captured by the circulating coolant stream, and the heat is stored in a nearby reservoir that is the hot energy storage (HES) 112 or heat source for the thermodynamic cycle generator 102. The coolant may be directly stored in the reservoir or may exchange heat with the fluid stored in the HES. The PV electrical power (or the grid) is used to power a chiller 114 to cool a fluid such as water in a second reservoir that is the cold energy storage (CES) 116. Excess electrical power produced by the thermodynamic cycle generator 102 may be used to power a load, for instance sold to power local systems and/or sold to a power grid 118. The two insulated storage reservoirs, HES 112 and CES 116, maintain a temperature difference that may be of approximately 90° C. For example, the temperature difference is approximately equivalent to the efficiency of a pumped hydrological system with a height difference of one kilometer.

Figure 2:
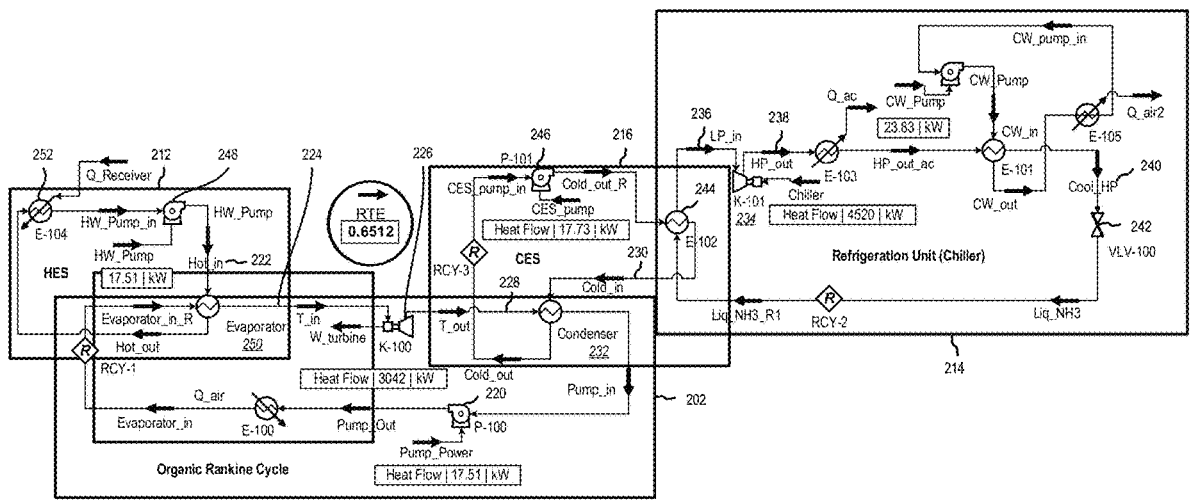
FIG. 2 is a simulation of a system for providing power including a cold energy storage and chiller, according to at least some embodiments of the present disclosure.

FIG. 2 is a simulation diagram for an energy storage aspect of another system including an ORC generator 202 (e.g., thermodynamic cycle generator 102 of FIG. 1). The ORC generator 202 is in thermal and hydraulic communication with an HES 212 and a CES 216 to provide the temperature differential to the ORC generator 202. FIG. 2 represents a steady state process, and in the simulation illustrated, the refrigeration provided by the chiller 214 is matched to the condenser duty in the ORC generator 202. In some embodiments, a generator working fluid is ammonia. In the simulation, ammonia is used as both the generator working fluid and as a refrigeration fluid in the chiller 214.

For the ORC generator 202 (i.e., thermodynamic working fluid cycle), Pump P-100 220 using Pump_Power increases the pressure of the generator working fluid (e.g., liquid ammonia) stream, which is the outlet stream labeled as Pump_out in FIG. 2. This outlet stream is first heated by ambient air (E-100) and then by a hot stream (Hot_in) 222 from the HES 212. At this point, the turbine inlet T_in stream 224 is converted into a high-pressure vapor stream.

The turbine inlet T_in stream 224 is expanded across expander K-100 226 to extract work. Turbine outlet T_out stream 228 is cool and is condensed by cold water from the CES 216. The Cold_in inlet 230 delivers cold water to the condenser 232. This generator working fluid is condensed in the condenser 232 and forms the inlet stream to the Pump P-100 220 to complete the ORC.

Referring now to the chiller 214, the compressor K-101 234 is used to compress the cool ammonia stream at the low-pressure LP_in inlet 236. In some embodiments, the hot high-pressure refrigeration fluid stream at the HP_out outlet 238 is cooled in an air-cooled heat exchanger E-103 and an optional water-cooled heat exchanger E-101 to create the refrigeration fluid stream Cool_HP 240. In some embodiments, the cooling water loop includes a pump CW_Pump (and air-cooled heat exchanger E-105. The refrigeration fluid stream Cool_HP 240, at saturated conditions, is expanded across a thermo-expansion valve VLV-100 242 into the two-phase region on an ammonia phase diagram. This cold ammonia stream is used to cool the water stored in CES by exchanging heat in the heat exchanger E-102 244.

The cold water loop is shown in the CES 216. In some embodiments, the cold water loop includes a pump P-101 246 to offset the pressure drop in heat exchangers E-102 244 and the condenser 232. In some embodiments, the pump P-101 246 uses energy CES_Pump. In some embodiments, the hot water loop is in the HES 212. In some embodiments, the hot water loop comprises a pump HW_Pump 248 using an energy stream HW_Pump to offset the pressure drop in heat exchanger Evaporator 250 and heat exchanger E-104 252.

In some embodiments, the PV modules of the solar energy harvesting system (such as described in relation to FIG. 1) generate electrical power to operate the chiller to maintain the temperature difference between the CES and the HES. In some embodiments, the PV modules produce surplus electrical power that is not needed to further cool the CES, and the surplus electrical power is provided to a load, such as to a regional power grid or local equipment. In some embodiments, the PV produce electrical power to cool the CES while coolth from the CES is used for other operations, such as chilling other materials or other regions of the system. In at least one example, a power generation system according to some embodiments of the present disclosure may provide electrical power at a wellsite for oil and/or gas extraction and provide improved efficiencies in gas condensation and capture.

Figure 3:
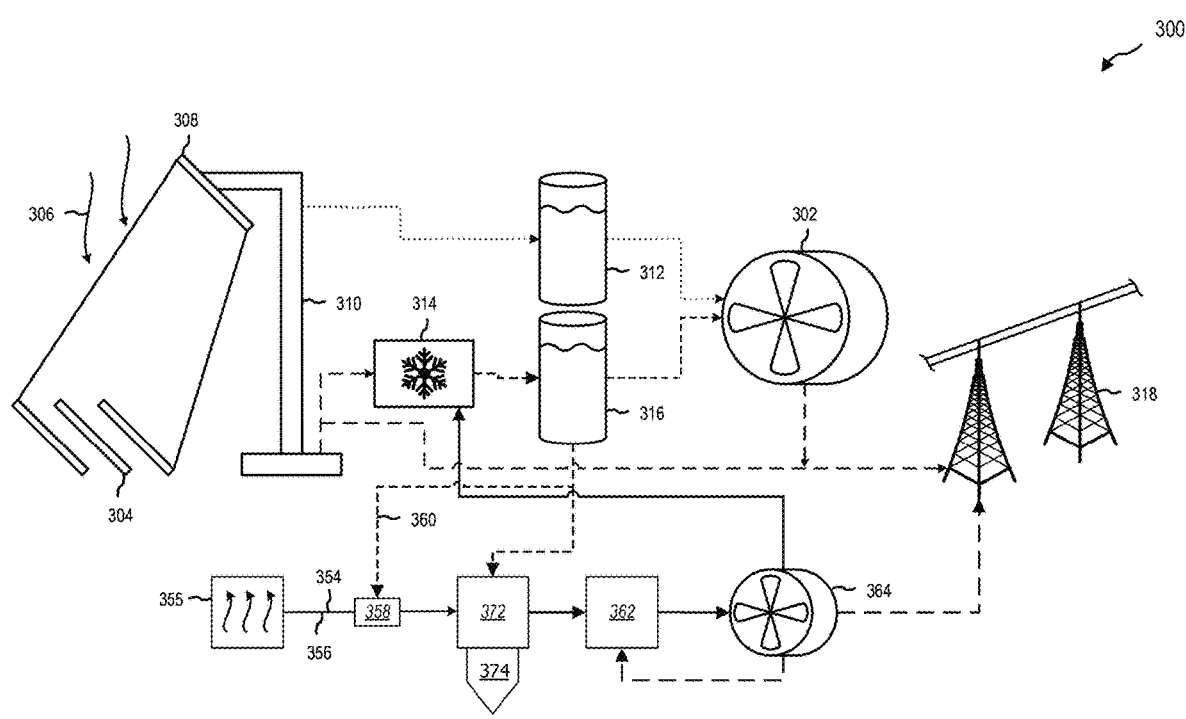
FIG. 3 is system diagram of an embodiment of a hybrid solar/thermodynamic cycle system thermally coupled to a flare gas supply, according to at least some embodiments of the present disclosure.

FIG. 3 is system diagram of an embodiment of a hybrid solar/thermodynamic cycle system 300 thermally coupled to a flare gas supply 355. In some embodiments, the flare gas supply 355 is a flare gas stream exiting a wellbore. In some embodiments, the flare gas supply is a stored portion of a flare gas from a wellbore. In some embodiments, a CES 316 of the system 300 provides coolth to (e.g., receives heat from) the flare gas supply to cool and condense flare gas. In some embodiments, the system 300 includes a thermodynamic cycle generator 302, such as a Rankine cycle generator, Kalina cycle generator, etc. One or more mirrors 304 direct sunlight 306 onto a solar thermal collector, such as raised PV modules 308 supported by a PV module tower 310, that are actively cooled by water or another cooling fluid circulated through the PV module tower 310. The PV modules 308 convert the sunlight 306 to energy with approximately 90% efficiency, with about 30% of the sunlight energy converted to electrical power by the PV modules 308 and about 60% converted to heat. The heat is captured by the circulating cooling stream, and the heat is stored in a nearby reservoir that is the HES 312 or heat source for the thermodynamic cycle generator 302. The PV electrical power (or the grid) is used to power a chiller 314 to cool a fluid in a second reservoir that is the CES 316. Excess electrical power produced by the thermodynamic cycle generator 302 may be used to power a load, for instance sold to power local systems and/or sold to a power grid 318. In some embodiments, the two insulated storage reservoirs, HES 312 and CES 316, maintain a temperature difference that may be of approximately 90° C.

Flare gas is excess natural gas that is produced in well operations. In some instances, the flare gas includes a plurality of different compounds in both gaseous and liquid states. The system 300 includes a heat exchanger 358 to transfer heat from the wet gas 356 of the flare gas conduit 354 to the CES 316 or storage working fluid thereof. In some embodiments, the heat exchanger 358 is in thermal communication with the CES 316 by a storage working fluid conduit(s) 360 that circulates the storage working fluid contained in the CES 316 through the heat exchanger 358. In some embodiments, the heat exchanger 358 is in thermal communication with the CES 316 by a dedicated loop of working fluid that is separate from the storage working fluid of the CES 316. In some embodiments, the storage working fluid is the same as the generator working fluid.

In some embodiments, the heat exchanger 358 cools the wet gas to condense at least a portion of the flare gas and produce dry gas downstream from the heat exchanger 358. In some examples, cooling the flare gas can remove at least a portion of the water therefrom. In some embodiments, the flare gas has one or more components removed and/or separated from the flare gas, such as carbon dioxide. In some embodiments, the system 300 includes a heat exchanger 358 to remove at least a portion of the water from the wet gas 356 before an extraction condenser 372 further cools the flare gas stream and condenses out at least one condensate 374. In some embodiments, the CES 316 provides coolth to the extraction condenser 372. The remaining dry gas may be further condensed and/or captured for storage or sale. In some examples, the dry gas may be compressed and/or condensed for transport through pipeline. In some examples, the dry gas may be compressed and/or condensed for storage in tanks or canisters for long-duration energy storage on site or for transport.

In some embodiments, the dry gas is condensed and/or compressed with the use of further coolth from the CES 316. In some embodiments, the cooling of the flare gas occurs in one step from a single heat exchanger (e.g., the heat exchanger 358 of FIG. 3). In some embodiments, the cooling occurs in a plurality of steps, such as a first heat exchanger to condense water out of the flare gas, and, after a separator to extract at least the liquid water, a second heat exchanger to further cool and compress the dry gas of the flare gas. In some embodiments, the processed dry gas is combusted.

Combustion of the dry gas can reduce the global warming potential (GWP), a measure of environmental impact, of emitted gases and compounds of the emitted gas, with an additional benefit the recovery of energy in the form of work and heat. The flare gas separated from the condensate is at a low temperature, as described herein. In some embodiments, the dry gas is mixed with compressed air coming from a compressor 362 and then combusted in a combustion generator 364 to generate electrical power. In some embodiments, the electrical power from the combustion generator 364 is used to power the compressor 362 and/or the chiller 314 as well as other pumps as needed by the system and/or exported to a grid 318. In some embodiments, the compressor 362 is located prior to the cooling and separation of the flare feed gas.

Figure 4:
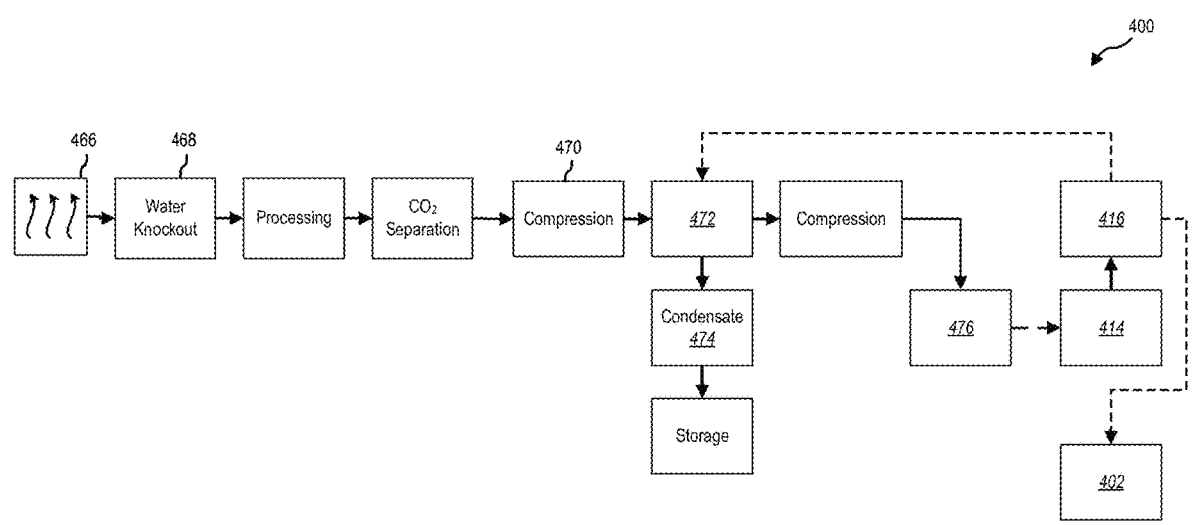
FIG. 4 is a block diagram illustrating a method of capturing gas condensates with a CES of a thermodynamic cycle generator, according to at least some embodiments of the present disclosure.

FIG. 4 is a block diagram illustrating a method of capturing gas condensates with a CES 416 of a thermodynamic cycle generator 402. In some embodiments, the flare gas 466 is gathered from the well and water is removed at a water knockout step 468. The flare gas 466 is, in some embodiments, further processed before compression at 470 and extraction. In some embodiments, the flare gas is compressed prior to the water knockout step 468 and further processing. The extraction condenser 472 receives coolth from the CES 416 to cool the flare gas and facilitate separation of the gas condensates 474 and remaining dry gas. The gas condensates 474 may be, in some examples, pumped to a pipeline or other transport and/or storage medium while the dry gas is separated for combustion. In some embodiments, the combustion and power generation via a combustion generator 476 provides electrical power back to a chiller 414 to maintain the coolth of the CES 416 used for both the extraction condenser 472 and any heat exchangers during processing of the flare gas, and to provide the temperature differential in the thermodynamic cycle generator 402.

Figure 5:
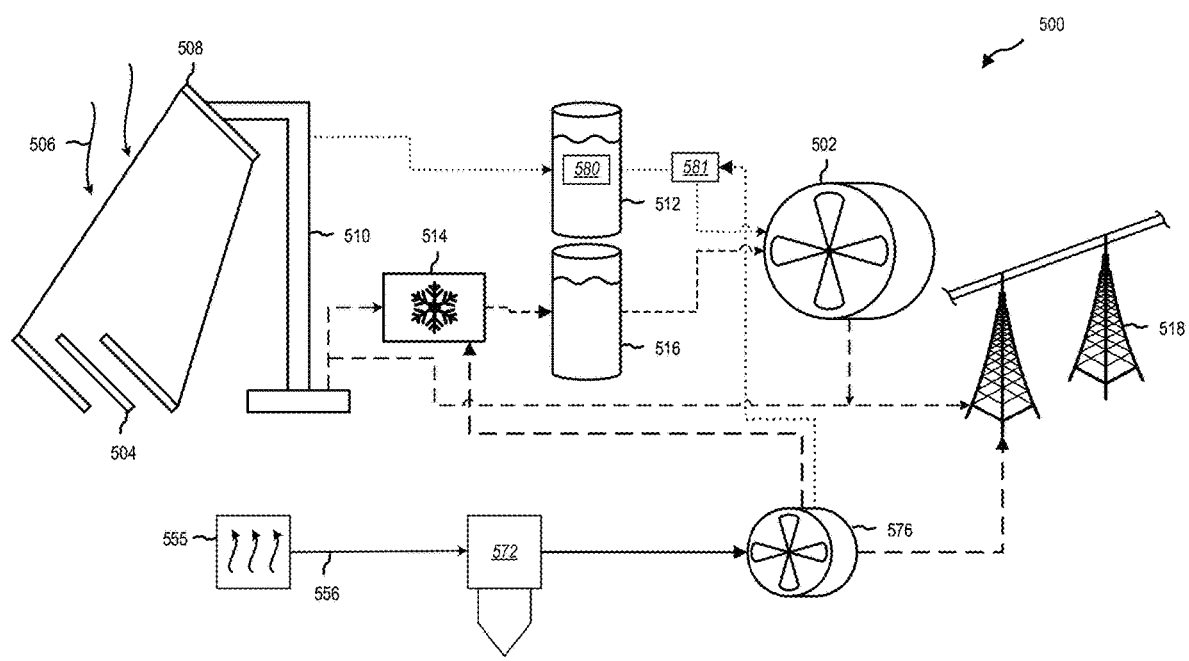
FIG. 5 is system diagram of an embodiment of a hybrid solar/thermodynamic cycle system thermally coupled to a gas combustion generator, according to at least some embodiments of the present disclosure.

FIG. 5 is system diagram of an embodiment of a hybrid solar/thermodynamic cycle system 500 thermally coupled to a gas combustion generator. In some embodiments, an HES 512 of the system 500 and/or a superheating heat exchanger 581 receives heat from a gas combustion generator 576 to maintain or further increase a temperature difference in the thermodynamic cycle generator 502 (e.g., ORC generator).

In some embodiments, one or more mirrors 504 direct sunlight 506 onto a solar thermal collector, such as raised PV modules 508 supported by a PV module tower 510, that are actively cooled by water or another storage working fluid circulated through the PV module tower 510. In some embodiments, the PV modules 508 convert the sunlight 506 to energy with approximately 90% efficiency, with about 30% of the sunlight energy converted to electrical power by the PV modules 508 and about 60% converted to heat. The heat is captured by the circulating liquid stream, and the heat is stored in a HES 512, such as a water reservoir, sand mass, or other thermal mass that can function as a heat source for the thermodynamic cycle generator 502. The PV electrical power (or grid power) is used to power a chiller 514 to cool a CES 516, such as a second water reservoir or another thermal mass. Excess electrical power produced by the thermodynamic cycle generator 502 may be used to power a load, for instance sold to power local systems and/or sold to a power grid 518. In some embodiments, two insulated and/or underground (or in-ground) storage reservoirs, HES 512 and CES 516, maintain a temperature difference of approximately 90° C. For example, with a water reservoir HES 512, the temperature of the HES 512 remains below 100° C. in most instances to prevent boiling of the water reservoir. In some embodiments, the HES 512 includes another fluid with a higher boiling temperature than water, and the temperature of the HES 512 is greater than 100° C.

The heat from the HES 512 may allow the heating or superheating of a generator working fluid of the thermodynamic cycle generator 502. For example, while some embodiments of a thermodynamic cycle generator 502 described herein are ORC generators, other thermodynamic cycle generators may have a greater temperature difference with a generator working fluid having a boiling temperature greater than 100° C. In some embodiments, the HES 512 heats the generator working fluid.

In some embodiments, a combustion generator 576 produces heat that is captured and/or recycled in the system 500. For example, combustion generator heat may be harvested directly from the combustion generator 576 (such as through circulation of fluid through a body or block of the combustion generator 576) and/or indirectly from the hot exhaust of the combustion generator 576. In some embodiments, a hot exhaust of flare gas combustion is recovered at the combustion generator 576 and directed to an HES heat exchanger 580 to heat a generator working fluid coming from the HES 512 and can thereafter be used in the thermodynamic cycle. In some embodiments, the high-grade combustion generator heat from combusting the dry gas in a combustion generator 576 (e.g., a turbine or internal combustion engine) is directed to a superheat heat exchanger 581 to superheat the generator working fluid.

In some embodiments, high-grade combustion generator heat from combusting the dry gas in a combustion generator 576 (e.g., a turbine or internal combustion engine) is directed to heat or superheat the generator working fluid directly and bypasses the HES 512. In some embodiments, the increases the thermodynamic cycle efficiency and utilization factor lower the operating expenses and/or resource consumption of the system 500. In some embodiments, recovery of low-grade waste heat from the combustion generator 576 (and provided to the HES 512) further improves the available stored energy during low solar generation periods.

Figure 6:
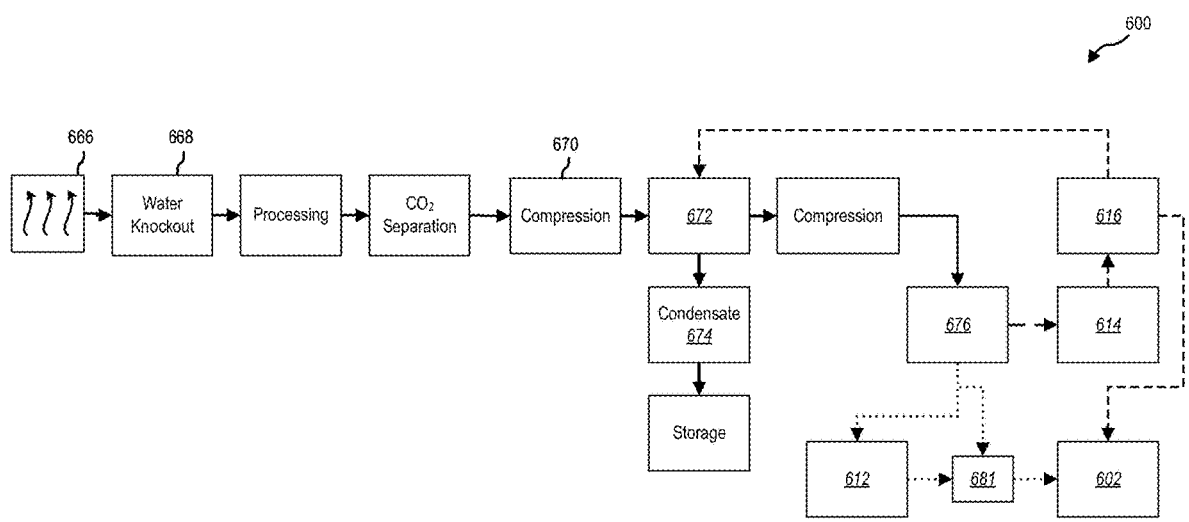
FIG. 6 is a block diagram illustrating a method of recycling heat from a gas combustion generator in a hybrid generator system, according to at least some embodiments of the present disclosure.

FIG. 6 is a block diagram illustrating a method of recycling heat from a gas combustion generator in a hybrid generator system 600. In some embodiments, the flare gas 666 is gathered from the well and water is removed at a water knockout step 668. The flare gas 666 is, in some embodiments, further processed before compression at 670 and extraction. In some embodiments, the flare gas is compressed prior to the water knockout step 668 and further processing. In some embodiments, the extraction condenser 672 separates the gas condensates 674 and remaining dry gas. The gas condensates 674 may be, in some examples, pumped to a pipeline or other transport and/or storage medium while the dry gas is separated for combustion. In some embodiments, the combustion and power generation via a combustion generator 676 provides electrical power back to a chiller 614 to maintain the coolth of the CES 616, any heat exchangers during processing of the flare gas, to provide the temperature differential in the thermodynamic cycle generator 602, or combinations thereof. In some embodiments, combustion generator heat is recycled to the HES 612 and/or a superheat heat exchanger 681. The superheat heat exchanger 681 transfers heat to the generator working fluid to superheat the generator working fluid before the thermodynamic cycle generator 602.

In some embodiments, capturing and recycling the combustion generator heat from the combustion of the dry gas in the combustion generator can reduce operation expenses and improve efficiency of the system. In some embodiments, further benefits are realized through the transmission of thermal energy between components of a hybrid generator system and both a CES and an HES.

Figure 7:
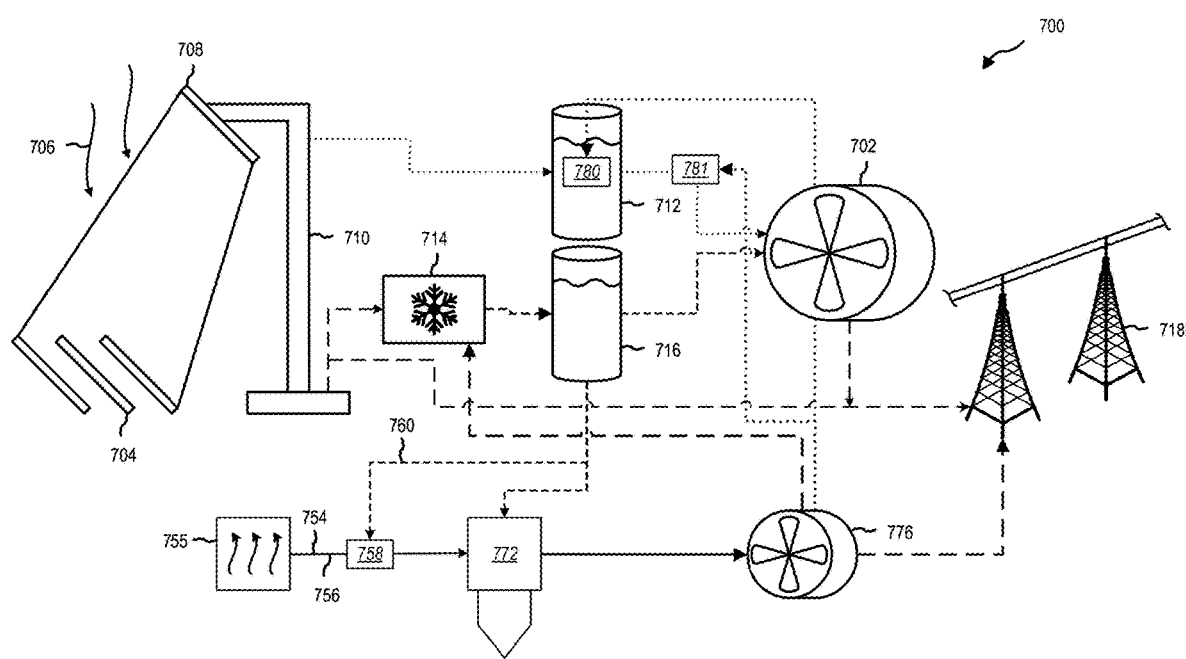
FIG. 7 is system diagram of an embodiment of a hybrid solar/thermodynamic cycle system with an extraction condenser and a gas combustion generator thermally coupled in the system to recycle thermal energy.

FIG. 7 is system diagram of an embodiment of a hybrid solar/thermodynamic cycle system 700 with an extraction condenser 772 and a gas combustion generator 776 thermally coupled in the system 700 to recycle thermal energy. In some embodiments, a CES 716 of the system 700 provides coolth to (e.g., receives heat from) the flare gas supply to cool and condense flare gas at least at the extraction condenser 772, and an HES 712 of the system 700 and/or a superheating exchanger 781 receives heat from a gas combustion generator 776 to maintain or further increase a temperature difference in the thermodynamic cycle generator 702 (e.g., ORC generator).

In some embodiments, one or more mirrors 704 direct sunlight 706 onto a solar thermal collector, such as raised PV modules 708 supported by a PV module tower 710, that are actively cooled by water or another storage working fluid circulated through the PV module tower 710. In some embodiments, the PV modules 708 convert the sunlight 706 to energy with approximately 90% efficiency, with about 30% of the sunlight energy converted to electrical power by the PV modules 708 and about 60% converted to heat. The heat is captured by the circulating liquid stream, and the heat is stored in a HES 712, such as a water reservoir, sand mass, or other thermal mass that can function as a heat source for the thermodynamic cycle generator 702. The PV electrical power (or grid power) is used to power a chiller 714 to cool a CES 716, such as a second water reservoir or another thermal mass. Excess electrical power produced by the thermodynamic cycle generator 702 may be used to power a load, for instance sold to power local systems and/or sold to a power grid 718. In some embodiments, two insulated and/or underground (or in-ground) storage reservoirs, HES 712 and CES 716, maintain a temperature difference of approximately 90° C. For example, with a water reservoir HES 712, the temperature of the HES 712 remains below 100° C. in most instances to prevent boiling of the water reservoir. In some embodiments, the HES 712 includes another fluid with a higher boiling temperature than water, and the temperature of the HES 712 is greater than 100° C.

The heat from the HES 712 may allow the heating or superheating of a generator working fluid of the thermodynamic cycle generator 702. For example, while some embodiments of a thermodynamic cycle generator 702 described herein are ORC generators, other thermodynamic cycle generators may have a greater temperature difference with a generator working fluid having a boiling temperature greater than 100° C. In some embodiments, the HES 712 heats the generator working fluid.

In some embodiments, a CES 716 of the system 700 provides coolth to (e.g., receives heat from) the flare gas supply to cool and condense flare gas. Flare gas is excess natural gas that is produced in well operations. In some instances, the flare gas includes a plurality of different compounds in both gaseous and liquid states. The system 700 includes a heat exchanger 758 to transfer heat from the wet gas 756 of the flare gas conduit 754 to the CES 716 or storage working fluid thereof. In some embodiments, the heat exchanger 758 is in thermal communication with the CES 716 by a storage working fluid conduit 760 that circulates the storage working fluid contained in the CES 716 through the heat exchanger 758. In some embodiments, the heat exchanger 758 is in thermal communication with the CES 716 by a dedicated loop of working fluid that is separate from the storage working fluid of the CES 716.

In some embodiments, the heat exchanger 758 cools the wet gas 756 to condense at least a portion of the flare gas and produce dry gas downstream from the heat exchanger 758. In some examples, cooling the flare gas can remove at least a portion of the water therefrom. In some embodiments, the flare gas has one or more components removed and/or separated from the flare gas, such as carbon dioxide. An extraction condenser 772 extracts one or more gas condensates from the dry gas. The remaining dry gas may be further condensed and/or captured for storage or sale. In some examples, the dry gas may be compressed and/or condensed for transport through pipeline. In some examples, the dry gas may be compressed and/or condensed for storage in tanks or canisters for long-duration energy storage on site or for transport.

In some embodiments, the dry gas is condensed and/or compressed with the use of further coolth from the CES 716. In some embodiments, the cooling of the flare gas occurs in one step from a single heat exchanger (e.g., the heat exchanger 758 of FIG. 7). In some embodiments, the cooling occurs in a plurality of steps, such as a first heat exchanger to condense water out of the flare gas, and, after a separator to extract at least the liquid water, a second heat exchanger to further cool and compress the dry gas of the flare gas, such as at the extraction condenser 772. In some embodiments, the processed dry gas is combusted.

In some embodiments, a combustion generator 776 produces combustion generator heat that is captured and/or recycled in the system 700. For example, combustion generator heat may be harvested directly from the combustion generator 776 (such as through circulation of fluid through a body or block of the combustion generator 776) and/or indirectly from the hot exhaust of the combustion generator 776. In some embodiments, a hot exhaust of flare gas combustion is recovered at the combustion generator 776 and directed to an HES heat exchanger 780 to heat a generator working fluid coming from the HES 712 and can thereafter be used in the thermodynamic cycle. In some embodiments, high-grade combustion generator heat from combusting the dry gas in a combustion generator 776 (e.g., a turbine or internal combustion engine) is directed to heat or superheat (e.g., via a superheat heat exchanger 781) the generator working fluid directly and bypasses the HES 712. In some embodiments, the increases of the thermodynamic cycle efficiency and utilization factor lower the operating expenses and/or resource consumption of the system 700. In some embodiments, recovery of low-grade waste heat from the combustion generator 776 (and provided to the HES 712) further improves the available stored energy during low solar generation periods.

Figure 8:
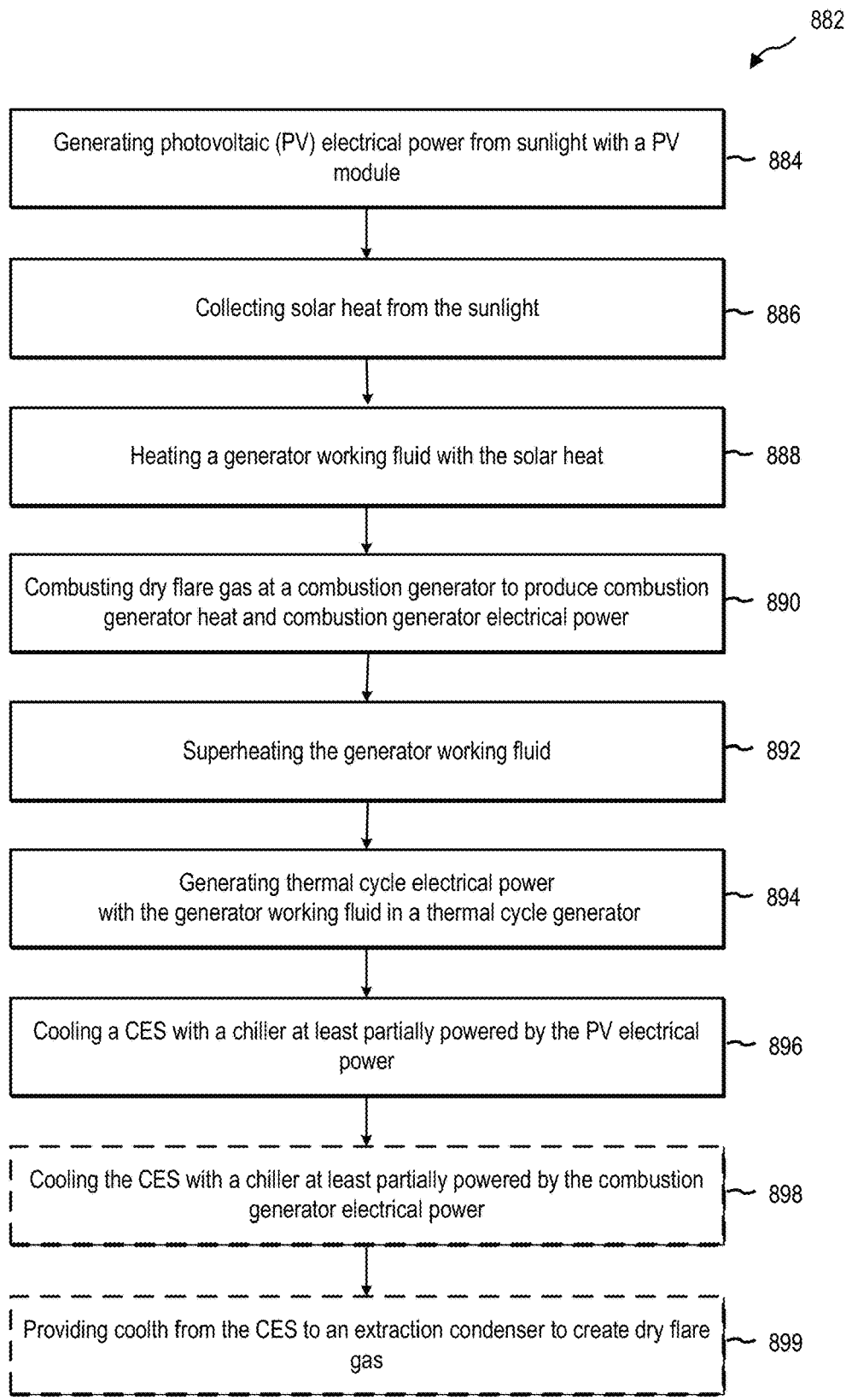
FIG. 8 is a flowchart illustrating a method of recycling thermal energy in a hybrid generator system, according to at least some embodiments of the present disclosure.

FIG. 8 is a flowchart illustrating a method 882 of recycling thermal energy in a hybrid generator system. In some embodiments, the method 882 includes generating photovoltaic (PV) electrical power with a PV module at 884. As described herein, the hybrid generator system produces at least some electrical power from a PV module that receives sunlight and converts at least a portion of the sunlight to solar electrical power and at least a portion of the sunlight to solar heat. In some embodiments, the method 882 includes collecting the solar heat from the sunlight with the PV module at 886. In some embodiments, collecting the solar heat includes flowing a storage fluid through the PV module to an HES to store the solar heat in the HES for use at a different time (e.g., when solar energy production is low). In some embodiments, the storage fluid is a fluid of the HES, such as water. For example, collecting the solar heat may include flowing the water from the HES through a first storage water conduit (e.g., pipe) to the PV module and/or PV support structure to receive the solar heat into the storage fluid. In some embodiments, the storage fluid is a fluid positioned in a first storage water conduit to receive the solar heat from the PV module and/or PV support structure and transfer the solar heat to a thermal mass of the HES, such as a second fluid or a solid material, such as a metal thermal mass or sand.

In some embodiments, the method 882 includes heating a generator working fluid with the solar heat at 888. In some embodiments, heating the generator working fluid includes directing heat from the HES to a heat exchanger to transfer heat to the generator working fluid. For example, directing heat from the HES may include flowing the hot storage fluid through a second storage fluid conduit to a heat exchange to transfer heat from the storage fluid of the HES to the generator working fluid. In some embodiments, directing heat from the HES includes receiving heat from the HES with a second storage fluid and flowing the second storage fluid through a second storage fluid conduit to a heat exchanger to transfer heat to the generator working fluid.

In some embodiments, heating the generator working fluid includes transferring heat from the PV module and/or PV support structure to the generator working fluid and bypassing the HES. In some embodiments, a system is selectively operable in a first mode in which the HES heats the generator working fluid and in a second mode in which the solar thermal collector directly heats the generator working fluid. For example, the method may include collecting the solar heat at a solar thermal collector of the PV module and/or PV support structure with the generator working fluid and flowing the generator working fluid without the solar heat being collected at the HES. The hot generator working fluid may allow the thermodynamic cycle generator to produce thermodynamic cycle electrical power, as will be described herein. For example, heating the generator working fluid may include flowing the generator working through a first generator fluid conduit from the thermodynamic cycle generator to the solar thermal collector of the PV module and/or PV support structure. The method 882, in some embodiments, includes flowing the hot generator working fluid from the solar thermal collector to the thermodynamic cycle generator directly through a second generator working fluid conduit.

In some embodiments, the method 882 further includes combusting dry flare gas or a derivative thereof at a combustion generator to produce combustion generator heat and combustion generator electrical power at 890. As described herein, the flare gas may be captured locally to the system from a wellbore. At least a portion of the flare gas is combusted in a combustion generator and the combustion generator heat is used to superheat the generator working fluid at 892. Superheating the generator working fluid, in some embodiments, allows the thermodynamic cycle generator to produce more thermodynamic cycle electrical power, as a temperature difference across the thermodynamic cycle is greater compared to without the superheating. In some embodiments, the combustion generator heat superheats the generator working fluid above a temperature of the HES and/or above a temperature of the storage fluid transferring heat to the generator working fluid.

In some embodiments, the method 882 further includes generating thermodynamic cycle electrical power in a thermodynamic cycle generator with the generator working fluid at 894. In some embodiments, the thermodynamic cycle generator generates electrical power based on a temperature difference between the HES and a CES. For example, the temperature difference across the thermodynamic cycle (e.g., Rankine cycle) is the temperature difference between the HES and the CES. The HES and CES heat and/or cool the generator working fluid through one or more heat exchangers. In some embodiments, the thermodynamic cycle generator generates electrical power based on a temperature difference greater than that between the HES and a CES. For example, the temperature difference of the generator working fluid across the thermodynamic cycle may be that of the superheated generator working fluid to the CES.

In some embodiments, the temperature difference is about 90° C. In some embodiments, the temperature difference is greater than 100° C.

The method 882 includes, in some embodiments, cooling the CES with a chiller at least partially powered by the PV electrical power at 896. As described herein, cooling the CES with the PV electrical power provides the CES while solar energy is collected from sunlight to ensure the temperature difference is present when the solar energy is unavailable or available in lower amounts. In some embodiments, the chiller is powered at least partially by the thermodynamic cycle electrical power. In some embodiments, the chiller is optionally powered at least partially by the combustion generator at 898.

In some embodiments, the method 882, optionally, includes providing coolth from the CES to an extraction condenser to create the dry flare gas or derivative thereof at 899. As described herein, the CES may provide coolth (i.e., receive heat from) an extraction condenser that further condenses a processed portion of the flare gas stream to separate at least one condensate from the dry flare gas. In at least one embodiment, the CES may, therefor, assist in efficiently producing dry gas, which is subsequently combusted to produce electrical power and heat the generator working fluid, which is used in the thermodynamic cycle generator to produce even more electrical power.

Figure 9:
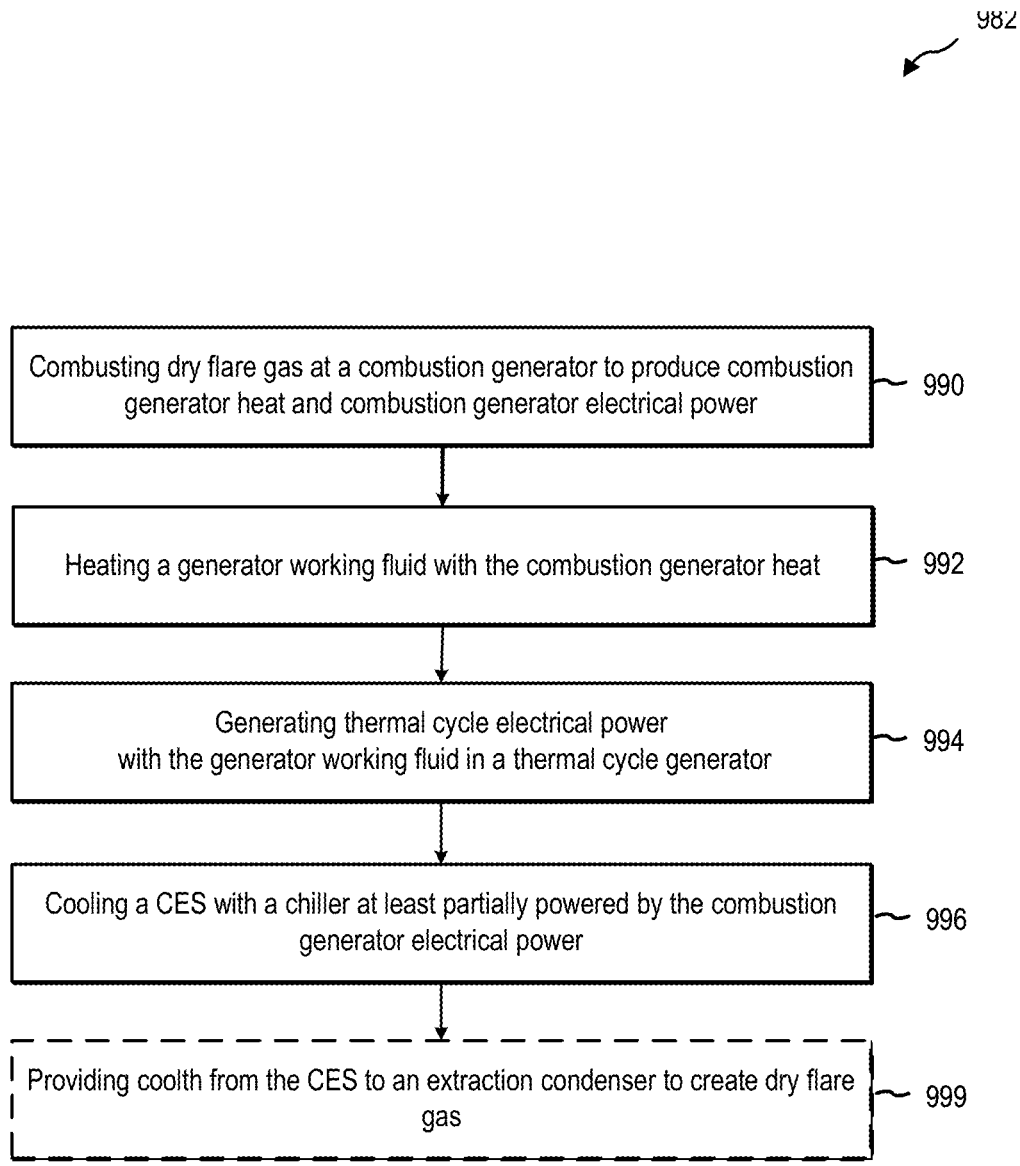
FIG. 9 is a flowchart illustrating another method of recycling thermal energy in a thermodynamic generator system.

FIG. 9 is a flowchart illustrating another method 982 of recycling thermal energy in a thermodynamic generator system. In some embodiments, the method 982 includes combusting dry flare gas or a derivative thereof at a combustion generator to produce combustion generator heat and combustion generator electrical power at 990. As described herein, the flare gas may be captured locally to the system exiting from a wellbore. At least a portion of the flare gas is combusted in a combustion generator and the combustion generator heat is used to heat the generator working fluid at 992. In some embodiments, the combustion generator heat is provided to an HES to heat the generator working fluid. In some embodiments, the combustion generator heat is further used to superheat the generator working fluid. In some embodiments, superheating allows the thermodynamic cycle generator to produce more thermodynamic cycle electrical power, as a temperature difference across the thermodynamic cycle is greater compared to without the superheating. In some embodiments, the combustion generator heat superheats the generator working fluid above a temperature of the HES and/or above a temperature of the storage fluid transferring heat to the generator working fluid.

In some embodiments, the method 982 further includes generating thermodynamic cycle electrical power in a thermodynamic cycle generator with the generator working fluid at 994. In some embodiments, the thermodynamic cycle generator generates electrical power based on a temperature difference between the HES and a CES. For example, the temperature difference across the thermodynamic cycle (e.g., Rankine cycle) is the temperature difference between the HES and the CES. The HES and CES heat and/or cool the generator working fluid through one or more heat exchangers. In some embodiments, the thermodynamic cycle generator generates electrical power based on a temperature difference greater than that between the HES and a CES. For example, the temperature difference of the generator working fluid across the thermodynamic cycle may be that of the superheated generator working fluid to the CES. In some embodiments, the temperature difference is about 90° C. In some embodiments, the temperature difference is greater than 100° C.

The method 982 includes, in some embodiments, cooling the CES with a chiller at least partially powered by combustion generator electrical power at 996. As described herein, cooling the CES with the combustion generator electrical power cools the CES while the combustion generator heat is created to generate the temperature difference. In some embodiments, the chiller is powered at least partially by the thermodynamic cycle electrical power. In some embodiments, the chiller is further powered at least partially PV or grid electrical power.

In some embodiments, the method 982, optionally, includes providing coolth from the CES to an extraction condenser to create the dry flare gas or a derivative thereof at 999. As described herein, the CES may provide coolth (i.e., receive heat from) an extraction condenser that further condenses a processed portion of the flare gas stream to separate at least one condensate from the dry flare gas. In at least one embodiment, the CES may, therefor, assist in efficiently producing dry gas, which is subsequently combusted to produce electrical power and heat the generator working fluid, which is used in the thermodynamic cycle generator to produce even more electrical power.

INDUSTRIAL APPLICABILITY

Embodiments of the present disclosure generally relate to energy storage and production. Many renewable energy sources produce intermittent energy, such as solar energy production that is greatest during full sun, less during overcast skies, and near zero during night. Short-term energy storage is storage of energy (thermal, mechanical, electrical, chemical, etc.) for no more than 4 hours of time. For example, lithium-ion batteries, on a large scale, become economically unviable for storage durations of greater than 4 hours. Lithium-ion batteries are generally used for short-term energy storage. In some embodiments, intermediate-term and/or long-term storage is needed to maintain a power supply through the night or during unfavorable weather when solar or wind power produces insufficient quantities of electrical power.

Other forms of energy storage can be more economical on intermediate-term and/or long-term scales. For example, pumped hydrological energy storage allows for the conversion of available energy (such as during periods of sunlight or wind) to gravitational potential energy of a mass of water that is pumped vertically upward, such as to a reservoir uphill or into a tower. Thermal energy storage stores energy as heat and converts a temperature difference to energy through a thermodynamic cycle, such as a Rankine cycle. The thermal energy storage is, in some embodiments, further used to condense and extract combustible gases as liquids for long-term energy storage and/or sale.

In some embodiments, a system for providing electrical power includes a high-temperature heat source, a low-temperature heat sink, a thermodynamic cycle generator, a solar thermal collector, and a gas condenser. The generator includes a generator working fluid with a boiling temperature greater than a low temperature of the low-temperature heat sink, and the generator working fluid receives heat from the high-temperature heat source and exhausts heat, evaporating and driving a turbine in rotation that produces electricity. The low temperature heat sink is used to condense the working fluid downstream of the turbine. Such generator works using a thermodynamic cycle, such as a Rankine cycle. The solar thermal collector is in thermal communication with the high-temperature heat source to heat the high-temperature heat source. The solar thermal collector includes a photovoltaic (PV) module, and the solar thermal collector is configured to convert a first portion of sunlight to thermal energy and a second portion of the sunlight to electrical energy. A chiller cools the low temperature heat sink using electrical energy provided by the PV module(s) and/or the generator. The low-temperature heat sink, in some embodiments, further cools a gas condenser to condense and extract one or more flare feed gases or other commodity gas condensates from a well.

In some embodiments, systems and methods according to the present disclosure use thermodynamic cycle, such as an organic Rankine cycle (ORC), to convert a temperature difference into energy. The generator uses a difference in temperature to drive a heat-to-power engine through the expansion of a generator working fluid. This engine may be used to provide power to the grid when solar modules are unable to generate power (at nighttime or on cloudy days) or wind turbines are unable to turn. For example, a generator working fluid has a boiling temperature (and condensation temperature) less than the boiling temperature of water of 100° C. (at one atmosphere pressure), if that is chosen as the hot storage source temperature. In some examples, the generator working fluid is liquid at ambient temperature (and pressure) and boils at a temperature less than the boiling temperature of water (at ambient pressure). The working fluid might be for instance ammonia.

A generator converts a temperature differential between a high temperature heat source and a low-temperature heat sink into mechanical energy, which may be converted to electrical energy and exported to a power grid or stored in another form of energy storage, such as a short-term, or long-term battery storage device. For example, the thermal storage may use a first mass of fluid, such as water, that is heated (for the high temperature heat source) and a second mass of fluid, such as water, that is cooled (for the low-temperature heat sink). For example, a high temperature thermal storage or heat source is maintained at or near the boiling temperature of water (or other fluid) and a low-temperature thermal storage is stored at or near the freezing temperature of water (or other fluid), such as in an ice slurry. In such examples, the temperature difference between the hot water and cold water storage is, therefore, at or near a maximum at atmospheric pressure.

In some embodiments, a system includes a thermodynamic cycle generator, such as a Rankine cycle generator, Kalina cycle generator, etc. associated with a solar energy harvesting system. One or more mirrors direct sunlight onto a solar thermal collector, such as raised photovoltaic (PV) modules supported by a PV module tower, that are actively cooled by a coolant (such as water) circulated through the PV module tower. The PV modules convert the sunlight to energy with approximately 90% efficiency, with about 30% of the sunlight energy converted to electrical power by the PV modules and about 60% converted to heat. The heat is captured by the circulating coolant stream, and the heat is stored in a nearby reservoir that is the hot energy storage (HES) or heat source for the thermodynamic cycle generator. The coolant may be directly stored in the reservoir or may exchange heat with the fluid stored in the HES. The PV electrical power (or the grid) is used to power a chiller to cool a fluid such as water in a second reservoir that is the cold energy storage (CES). Excess electrical power produced by the thermodynamic cycle generator may be used to power a load, for instance sold to power local systems and/or sold to a power grid. The two insulated storage reservoirs, HES and CES, maintain a temperature difference that may be of approximately 90° C. For example, the temperature difference is approximately equivalent to the efficiency of a pumped hydrological system with a height difference of one kilometer.

In some embodiments, an embodiment of a hybrid solar/thermodynamic cycle system is thermally coupled to a flare gas supply. In some embodiments, the flare gas supply is a flare gas stream exiting a wellbore. In some embodiments, the flare gas supply is a stored portion of a flare gas from a wellbore. In some embodiments, a CES of the system provides coolth to (e.g., receives heat from) the flare gas supply to cool and condense flare gas. In some embodiments, the system includes a thermodynamic cycle generator, such as a Rankine cycle generator, Kalina cycle generator, etc. One or more mirrors direct sunlight onto a solar thermal collector, such as raised PV modules supported by a PV module tower, that are actively cooled by water or another cooling fluid circulated through the PV module tower. The PV modules convert the sunlight to energy with approximately 90% efficiency, with about 30% of the sunlight energy converted to electrical power by the PV modules and about 60% converted to heat. The heat is captured by the circulating cooling stream, and the heat is stored in a nearby reservoir that is the HES 312 or heat source for the thermodynamic cycle generator. The PV electrical power (or the grid) is used to power a chiller to cool a fluid in a second reservoir that is the CES. Excess electrical power produced by the thermodynamic cycle generator may be used to power a load, for instance sold to power local systems and/or sold to a power grid. In some embodiments, the two insulated storage reservoirs, HES and CES, maintain a temperature difference that may be of approximately 90° C.

Flare gas is excess natural gas that is produced in well operations. In some instances, the flare gas includes a plurality of different compounds in both gaseous and liquid states. The system includes a heat exchanger to transfer heat from the wet gas of the flare gas conduit to the CES or storage working fluid thereof. In some embodiments, the heat exchanger is in thermal communication with the CES by a storage working fluid conduit(s) that circulates the storage working fluid contained in the CES through the heat exchanger. In some embodiments, the heat exchanger is in thermal communication with the CES by a dedicated loop of working fluid that is separate from the storage working fluid of the CES. In some embodiments, the storage working fluid is the same as the generator working fluid.

In some embodiments, the heat exchanger cools the wet gas to condense at least a portion of the flare gas and produce dry gas downstream from the heat exchanger. In some examples, cooling the flare gas can remove at least a portion of the water therefrom. In some embodiments, the flare gas has one or more components removed and/or separated from the flare gas, such as carbon dioxide. In some embodiments, the system includes a heat exchanger to remove at least a portion of the water from the wet gas before an extraction condenser further cools the flare gas stream and condenses out at least one condensate. In some embodiments, the CES provides coolth to the extraction condenser. The remaining dry gas may be further condensed and/or captured for storage or sale. In some examples, the dry gas may be compressed and/or condensed for transport through pipeline. In some examples, the dry gas may be compressed and/or condensed for storage in tanks or canisters for long-duration energy storage on site or for transport.

In some embodiments, the dry gas is condensed and/or compressed with the use of further coolth from the CES. In some embodiments, the cooling of the flare gas occurs in one step from a single heat exchanger. In some embodiments, the cooling occurs in a plurality of steps, such as a first heat exchanger to condense water out of the flare gas, and, after a separator to extract at least the liquid water, a second heat exchanger to further cool and compress the dry gas of the flare gas. In some embodiments, the processed dry gas is combusted.

Combustion of the dry gas can reduce the global warming potential (GWP), a measure of environmental impact, of emitted gases and compounds of the emitted gas, with an additional benefit the recovery of energy in the form of work and heat. The flare gas separated from the condensate is at a low temperature, as described herein. In some embodiments, the dry gas is mixed with compressed air coming from a compressor and then combusted in a combustion generator to generate electrical power. In some embodiments, the electrical power from the combustion generator is used to power the compressor and/or the chiller as well as other pumps as needed by the system and/or exported to a grid. In some embodiments, the compressor is located prior to the cooling and separation of the flare feed gas.

In some embodiments, the flare gas is gathered from the well and water is removed at a water knockout step. The flare gas is, in some embodiments, further processed before compression at and extraction. In some embodiments, the flare gas is compressed prior to the knockout and further processing. The extraction condenser receives coolth from the CES to cool the flare gas and facilitate separation of the gas condensates and remaining dry gas. The gas condensates may be, in some examples, pumped to a pipeline or other transport and/or storage medium while the dry gas is separated for combustion. In some embodiments, the combustion and power generation via a combustion generator provides electrical power back to a chiller to maintain the coolth of the CES used for both the extraction condenser and any heat exchangers during processing of the flare gas, and to provide the temperature differential in the thermodynamic cycle generator.

In some embodiments, an HES of the system and/or a superheating heat exchanger receives heat from a gas combustion generator to maintain or further increase a temperature difference in the thermodynamic cycle generator (e.g., ORC generator).

In some embodiments, one or more mirrors direct sunlight onto a solar thermal collector, such as raised PV modules supported by a PV module tower, that is actively cooled by water or another storage working fluid circulated through the PV module tower. In some embodiments, the PV modules convert the sunlight to energy with approximately 90% efficiency, with about 30% of the sunlight energy converted to electrical power by the PV modules and about 60% converted to heat. The heat is captured by the circulating liquid stream, and the heat is stored in a HES, such as a water reservoir, sand mass, or other thermal mass that can function as a heat source for the thermodynamic cycle generator. The PV electrical power (or grid power) is used to power a chiller to cool a CES, such as a second water reservoir or another thermal mass. Excess electrical power produced by the thermodynamic cycle generator may be used to power a load, for instance sold to power local systems and/or sold to a power grid. In some embodiments, two insulated and/or underground (or in-ground) storage reservoirs, HES and CES, maintain a temperature difference of approximately 90° C. For example, with a water reservoir HES, the temperature of the HES remains below 100° C. in most instances to prevent boiling of the water reservoir. In some embodiments, the HES includes another fluid with a higher boiling temperature than water, and the temperature of the HES is greater than 100° C.

The heat from the HES may allow the heating or superheating of a generator working fluid of the thermodynamic cycle generator. For example, while some embodiments of a thermodynamic cycle generator described herein are ORC generators, other thermodynamic cycle generators may have a greater temperature difference with a generator working fluid having a boiling temperature greater than 100° C. In some embodiments, the HES heats the generator working fluid.

In some embodiments, a combustion generator produces heat that is captured and/or recycled in the system. For example, combustion generator heat may be harvested directly from the combustion generator (such as through circulation of fluid through a body or block of the combustion generator) and/or indirectly from the hot exhaust of the combustion generator. In some embodiments, a hot exhaust of flare gas combustion is recovered at the combustion generator and directed to an HES heat exchanger to heat a generator working fluid coming from the HES and can thereafter be used in the thermodynamic cycle. In some embodiments, the high-grade combustion generator heat from combusting the dry gas in a combustion generator (e.g., a turbine or internal combustion engine) is directed to a superheat heat exchanger to superheat the generator working fluid.

In some embodiments, high-grade combustion generator heat from combusting the dry gas in a combustion generator (e.g., a turbine or internal combustion engine) is directed to heat or superheat the generator working fluid directly and bypasses the HES. In some embodiments, the increases the thermodynamic cycle efficiency and utilization factor lower the operating expenses and/or resource consumption of the system. In some embodiments, recovery of low-grade waste heat from the combustion generator (and provided to the HES) further improves the available stored energy during low solar generation periods.

In some embodiments, the flare gas is gathered from the well and water is removed at a water knockout step. The flare gas is, in some embodiments, further processed before compression at and extraction. In some embodiments, the flare gas is compressed prior to the knockout and further processing. In some embodiments, the extraction condenser separates the gas condensates and remaining dry gas. The gas condensates may be, in some examples, pumped to a pipeline or other transport and/or storage medium while the dry gas is separated for combustion. In some embodiments, the combustion and power generation via a combustion generator provides electrical power back to a chiller to maintain the coolth of the CES, any heat exchangers during processing of the flare gas, to provide the temperature differential in the thermodynamic cycle generator, or combinations thereof. In some embodiments, combustion generator heat is recycled to the HES and/or a superheat heat exchanger. The superheat heat exchanger transfers heat to the generator working fluid to superheat the generator working fluid before the thermodynamic cycle generator.

In some embodiments, capturing and recycling the combustion generator heat from the combustion of the dry gas in the combustion generator can reduce operation expenses and improve efficiency of the system. In some embodiments, further benefits are realized through the transmission of thermal energy between components of a hybrid generator system and both a CES and an HES.

In some embodiments, a CES of the system provides coolth to (e.g., receives heat from) the flare gas supply to cool and condense flare gas at least at the extraction condenser, and an HES of the system and/or a superheat heat exchanger receives heat from a gas combustion generator to maintain or further increase a temperature difference in the thermodynamic cycle generator (e.g., ORC generator).

In some embodiments, one or more mirrors direct sunlight onto a solar thermal collector, such as raised PV modules supported by a PV module tower, that are actively cooled by water or another storage working fluid circulated through the PV module tower. In some embodiments, the PV modules convert the sunlight to energy with approximately 90% efficiency, with about 30% of the sunlight energy converted to electrical power by the PV modules and about 60% converted to heat. The heat is captured by the circulating liquid stream, and the heat is stored in a HES, such as a water reservoir, sand mass, or other thermal mass that can function as a heat source for the thermodynamic cycle generator. The PV electrical power (or grid power) is used to power a chiller to cool a CES, such as a second water reservoir or another thermal mass. Excess electrical power produced by the thermodynamic cycle generator may be used to power a load, for instance sold to power local systems and/or sold to a power grid. In some embodiments, two insulated and/or underground (or in-ground) storage reservoirs, HES and CES, maintain a temperature difference of approximately 90° C. For example, with a water reservoir HES, the temperature of the HES remains below 100° C. in most instances to prevent boiling of the water reservoir. In some embodiments, the HES includes another fluid with a higher boiling temperature than water, and the temperature of the HES is greater than 100° C.

The heat from the HES may allow the heating or superheating of a generator working fluid of the thermodynamic cycle generator. For example, while some embodiments of a thermodynamic cycle generator described herein are ORC generators, other thermodynamic cycle generators may have a greater temperature difference with a generator working fluid having a boiling temperature greater than 100° C. In some embodiments, the HES heats the generator working fluid.

In some embodiments, a CES of the system provides coolth to (e.g., receives heat from) the flare gas supply to cool and condense flare gas. Flare gas is excess natural gas that is produced in well operations. In some instances, the flare gas includes a plurality of different compounds in both gaseous and liquid states. The system includes a heat exchanger to transfer heat from the wet gas of the flare gas conduit to the CES or storage working fluid thereof. In some embodiments, the heat exchanger is in thermal communication with the CES by a storage working fluid conduit that circulates the storage working fluid contained in the CES through the heat exchanger. In some embodiments, the heat exchanger is in thermal communication with the CES by a dedicated loop of working fluid that is separate from the storage working fluid of the CES.

In some embodiments, the heat exchanger cools the wet gas to condense at least a portion of the flare gas and produce dry gas downstream from the heat exchanger. In some examples, cooling the flare gas can remove at least a portion of the water therefrom. In some embodiments, the flare gas has one or more components removed and/or separated from the flare gas, such as carbon dioxide. An extraction condenser extracts one or more gas condensates from the dry gas. The remaining dry gas may be further condensed and/or captured for storage or sale. In some examples, the dry gas may be compressed and/or condensed for transport through pipeline. In some examples, the dry gas may be compressed and/or condensed for storage in tanks or canisters for long-duration energy storage on site or for transport.

In some embodiments, the dry gas is condensed and/or compressed with the use of further coolth from the CES. In some embodiments, the cooling of the flare gas occurs in one step from a single heat exchanger. In some embodiments, the cooling occurs in a plurality of steps, such as a first heat exchanger to condense water out of the flare gas, and, after a separator to extract at least the liquid water, a second heat exchanger to further cool and compress the dry gas of the flare gas, such as at the extraction condenser. In some embodiments, the processed dry gas is combusted.

In some embodiments, a combustion generator produces combustion generator heat that is captured and/or recycled in the system. For example, combustion generator heat may be harvested directly from the combustion generator (such as through circulation of fluid through a body or block of the combustion generator) and/or indirectly from the hot exhaust of the combustion generator. In some embodiments, a hot exhaust of flare gas combustion is recovered at the combustion generator and directed to an HES heat exchanger to heat a generator working fluid coming from the HES and can thereafter be used in the thermodynamic cycle. In some embodiments, high-grade combustion generator heat from combusting the dry gas in a combustion generator (e.g., a turbine or internal combustion engine) is directed to heat or superheat (e.g., via a superheat heat exchanger) the generator working fluid directly and bypasses the HES. In some embodiments, the increases of the thermodynamic cycle efficiency and utilization factor lower the operating expenses and/or resource consumption of the system. In some embodiments, recovery of low-grade waste heat from the combustion generator (and provided to the HES) further improves the available stored energy during low solar generation periods.

In some embodiments, a method of recycling thermal energy in a hybrid generator system includes generating photovoltaic (PV) electrical power with a PV module. As described herein, the hybrid generator system produces at least some electrical power from a PV module that receives sunlight and converts at least a portion of the sunlight to solar electrical power and at least a portion of the sunlight to solar heat. In some embodiments, the method includes collecting the solar heat from the sunlight with the PV module. In some embodiments, collecting the solar heat includes flowing a storage fluid through the PV module to an HES to store the solar heat in the HES for use at a different time (e.g., when solar energy production is low). In some embodiments, the storage fluid is a fluid of the HES, such as water. For example, collecting the solar heat may include flowing the water from the HES through a first storage water conduit (e.g., pipe) to the PV module and/or PV support structure to receive the solar heat into the storage fluid. In some embodiments, the storage fluid is a fluid positioned in a first storage water conduit to receive the solar heat from the PV module and/or PV support structure and transfer the solar heat to a thermal mass of the HES, such as a second fluid or a solid material, such as a metal thermal mass or sand.

In some embodiments, the method includes heating a generator working fluid with the solar heat. In some embodiments, heating the generator working fluid includes directing heat from the HES to a heat exchanger to transfer heat to the generator working fluid. For example, directing heat from the HES may include flowing the hot storage fluid through a second storage fluid conduit to a heat exchange to transfer heat from the storage fluid of the HES to the generator working fluid. In some embodiments, directing heat from the HES includes receiving heat from the HES with a second storage fluid and flowing the second storage fluid through a second storage fluid conduit to a heat exchanger to transfer heat to the generator working fluid.

In some embodiments, heating the generator working fluid includes transferring heat from the PV module and/or PV support structure to the generator working fluid and bypassing the HES. In some embodiments, a system is selectively operable in a first mode in which the HES heats the generator working fluid and in a second mode in which the solar thermal collector directly heats the generator working fluid. For example, the method may include collecting the solar heat at a solar thermal collector of the PV module and/or PV support structure with the generator working fluid and flowing the generator working fluid without the solar heat being collected at the HES. The hot generator working fluid may allow the thermodynamic cycle generator to produce thermodynamic cycle electrical power, as will be described herein. For example, heating the generator working fluid may include flowing the generator working fluid through a first generator fluid conduit from the thermodynamic cycle generator to the solar thermal collector of the PV module and/or PV support structure. The method, in some embodiments, includes flowing the hot generator working fluid from the solar thermal collector to the thermodynamic cycle generator directly through a second generator working fluid conduit.

In some embodiments, the method further includes combusting dry flare gas or a derivative thereof at a combustion generator to produce combustion generator heat and combustion generator electrical power. As described herein, the flare gas may be captured locally to the system from a wellbore. At least a portion of the flare gas is combusted in a combustion generator and the combustion generator heat is used to superheat the generator working fluid. Superheating the generator working fluid, in some embodiments, allows the thermodynamic cycle generator to produce more thermodynamic cycle electrical power, as a temperature difference across the thermodynamic cycle is greater compared to without the superheating. In some embodiments, the combustion generator heat superheats the generator working fluid above a temperature of the HES and/or above a temperature of the storage fluid transferring heat to the generator working fluid.

In some embodiments, the method further includes generating thermodynamic cycle electrical power in a thermodynamic cycle generator with the generator working fluid. In some embodiments, the thermodynamic cycle generator generates electrical power based on a temperature difference between the HES and a CES. For example, the temperature difference across the thermodynamic cycle (e.g., Rankine cycle) is the temperature difference between the HES and the CES. The HES and CES heat and/or cool the generator working fluid through one or more heat exchangers. In some embodiments, the thermodynamic cycle generator generates electrical power based on a temperature difference greater than that between the HES and a CES. For example, the temperature difference of the generator working fluid across the thermodynamic cycle may be that of the superheated generator working fluid to the CES. In some embodiments, the temperature difference is about 90° C. In some embodiments, the temperature difference is greater than 100° C.

The method includes, in some embodiments, cooling the CES with a chiller at least partially powered by the PV electrical power. As described herein, cooling the CES with the PV electrical power provides the CES while solar energy is collected from sunlight to ensure the temperature difference is present when the solar energy is unavailable or available in lower amounts. In some embodiments, the chiller is powered at least partially by the thermodynamic cycle electrical power. In some embodiments, the chiller is optionally powered at least partially by the combustion generator.

In some embodiments, the method, optionally, includes providing coolth from the CES to an extraction condenser to create the dry flare gas or a derivative thereof. As described herein, the CES may provide coolth (i.e., receive heat from) an extraction condenser that further condenses a processed portion of the flare gas stream to separate at least one condensate from the dry flare gas. In at least one embodiment, the CES may, therefor, assist in efficiently producing dry gas, which is subsequently combusted to produce electrical power and heat the generator working fluid, which is used in the thermodynamic cycle generator to produce even more electrical power.

In some embodiments, the method of recycling thermal energy in a thermodynamic generator system includes combusting dry flare gas or a derivative thereof at a combustion generator to produce combustion generator heat and combustion generator electrical power. As described herein, the flare gas may be captured locally to the system exiting from a wellbore. At least a portion of the flare gas is combusted in a combustion generator and the combustion generator heat is used to heat the generator working fluid. In some embodiments, the combustion generator heat is provided to an HES to heat the generator working fluid. In some embodiments, the combustion generator heat is further used to superheat the generator working fluid. In some embodiments, superheating allows the thermodynamic cycle generator to produce more thermodynamic cycle electrical power, as a temperature difference across the thermodynamic cycle is greater compared to without the superheating. In some embodiments, the combustion generator heat superheats the generator working fluid above a temperature of the HES and/or above a temperature of the storage fluid transferring heat to the generator working fluid.

In some embodiments, the method further includes generating thermodynamic cycle electrical power in a thermodynamic cycle generator with the generator working fluid. In some embodiments, the thermodynamic cycle generator generates electrical power based on a temperature difference between the HES and a CES. For example, the temperature difference across the thermodynamic cycle (e.g., Rankine cycle) is the temperature difference between the HES and the CES. The HES and CES heat and/or cool the generator working fluid through one or more heat exchangers. In some embodiments, the thermodynamic cycle generator generates electrical power based on a temperature difference greater than that between the HES and a CES. For example, the temperature difference of the generator working fluid across the thermodynamic cycle may be that of the superheated generator working fluid to the CES. In some embodiments, the temperature difference is about 90° C. In some embodiments, the temperature difference is greater than 100° C.

The method includes, in some embodiments, cooling the CES with a chiller at least partially powered by combustion generator electrical power. As described herein, cooling the CES with the combustion generator electrical power cools the CES while the combustion generator heat is created to generate the temperature difference. In some embodiments, the chiller is powered at least partially by the thermodynamic cycle electrical power. In some embodiments, the chiller is further powered at least partially PV or grid electrical power.

In some embodiments, the method, optionally, includes providing coolth from the CES to an extraction condenser to create the dry flare gas or a derivative thereof. As described herein, the CES may provide coolth (i.e., receive heat from) an extraction condenser that further condenses a processed portion of the flare gas stream to separate at least one condensate from the dry flare gas. In at least one embodiment, the CES may, therefor, assist in efficiently producing dry gas, which is subsequently combusted to produce electrical power and heat the generator working fluid, which is used in the thermodynamic cycle generator to produce even more electrical power.

The present disclosure relates to systems and methods for providing electrical power according to any of the following:

Clause 1. A system for providing electrical power, the system comprising: a hot energy storage (HES); a cold energy storage (CES); an extraction condenser, wherein the extraction condenser receives coolth from the CES and is configured to condense at least a portion of a flare gas stream exiting a wellbore to produce a dry flare gas; a combustion generator configured to produce combustion generator electrical power and combustion generator heat by combusting at least one portion of the dry flare gas or a derivative thereof and configured to provide the combustion generator heat to the HES; and a thermodynamic cycle generator including a generator working fluid and configured to produce thermodynamic cycle electrical power, and wherein the generator working fluid receives heat from the HES.

Clause 2. The system of clause 1, wherein the HES is a water reservoir.

Clause 3. The system of clause 1 or 2, wherein the CES is a water reservoir.

Clause 4. The system of any preceding clause, wherein the thermodynamic cycle generator is an organic Rankine cycle (ORC) generator or Kalina cycle generator.

Clause 5. The system of any preceding clause, further comprising: a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy.

Clause 6. The system of clause 5, further comprising: a first generator working fluid conduit configured to flow generator working fluid from the thermodynamic cycle generator to the solar thermal collector; and a second generator working fluid conduit configured to flow hot generator working fluid from the solar thermal collector to the thermodynamic cycle generator.

Clause 7. The system of clause 6, wherein the system is selectively operable in a first mode in which the HES heats the generator working fluid and in a second mode in which a solar thermal collector directly heats the generator working fluid.

Clause 8. The system of any preceding clause, further comprising a chiller that receives electrical power from one or more power sources, such as the combustion generator and/or the PV module, and cools the CES.

Clause 9. The system of claim 8, further comprising further comprising a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy, wherein the one or more power sources include the PV module.

Clause 10. The system of any preceding clause, further comprising a heat exchanger in thermal communication with a flare gas conduit before the extraction condenser configured to condense water from the flare gas stream, wherein the heat exchanger is configured to receive coolth from the CES.

Clause 11. The system of any preceding clause, wherein the combustion generator heat superheats the generator working fluid at a superheat heat exchanger.

Clause 12. The system of any preceding clause, wherein the combustion generator is configured to combust the at least a portion of the flare gas stream.

Clause 13. The system of any preceding clause, wherein one or more of the combustion generator and the thermodynamic cycle generator are in electrical communication with a regional power grid and are configured to transfer at least a portion of electrical power produced by the one or more of the combustion generator and the thermodynamic cycle generator to the regional power grid.

Clause 14. A method of providing electrical power, the method comprising: combusting dry flare gas at a combustion generator to produce combustion generator heat and combustion generator electrical power; heating a generator working fluid with the combustion generator heat; generating thermodynamic cycle electrical power in a thermodynamic cycle generator with the generator working fluid; and cooling the generator working fluid with coolth from a chiller at least partially powered by the combustion generator electrical power.

Clause 15. The method of clause 14, further comprising, condensing at least a portion of a flare gas stream exiting a wellbore to produce the dry flare gas at an extraction condenser.

Clause 16. The method of clause 15, wherein condensing at least a portion of the flare gas stream includes providing coolth to the extraction condenser from the chiller.

Clause 17. The method of clause 16, wherein the chiller cools a cool energy storage (CES), and the CES provides coolth to cool at least one of the generator working fluid and the extraction condenser.

Clause 18. The method of any of clauses 14-17, wherein the combustion generator heat superheats the generator working fluid.

Clause 19. The method of any of clauses 14-18, wherein the combustion generator heat is provided to a hot energy storage (HES) to heat the HES.

Clause 20. A method of providing electrical power, the method comprising: generating photovoltaic (PV) electrical power with a PV module; collecting solar heat from sunlight with a solar collector associated with the PV module; heating a generator working fluid with the solar heat; combusting dry flare gas at a combustion generator to produce combustion generator heat and combustion generator electrical power; superheating the generator working fluid with the combustion generator heat; generating thermodynamic cycle electrical power in a thermodynamic cycle generator with the generator working fluid; and cooling a cold energy storage (CES) with a chiller at least partially powered by the PV electrical power.

Clause 21. The method of clause 10, wherein collecting solar heat from sunlight includes heating a hot energy storage (HES) with the sunlight, and heating the generator working fluid includes heating the generator working fluid with the HES.

Clause 22. A system for providing electrical power, the system comprising: a hot energy storage (HES); a cold energy storage (CES); a combustion generator configured to produce combustion generator electrical power and combustion generator heat by combusting at least one portion of a dry flare gas or a derivative thereof and configured to provide the combustion generator heat to the HES; a chiller configured to receive combustion generator electrical power and cool the CES; and a thermodynamic cycle generator including a generator working fluid and configured to produce thermodynamic cycle electrical power, wherein the generator working fluid receives heat from the HES and receives coolth from the CES.

Clause 23. The system of clause 22, further comprising a solar thermal collector including a photovoltaic (PV) module, and the solar thermal collector is configured to convert a first portion of sunlight to solar thermal energy and a second portion of the sunlight to solar electrical energy, wherein the solar thermal collector is in thermal communication with the HES to heat the HES with the solar thermal energy, and the PV module of the solar thermal collector is in electrical communication with the chiller to cool the CES.

Clause 24. The system of clauses 22-23, including one or more features of clauses 1-13.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A system for providing electrical power, the system comprising:
   a hot energy storage (HES);
   a cold energy storage (CES);
   an extraction condenser, wherein the extraction condenser receives coolth from the CES and is configured to condense at least a portion of a flare gas stream exiting a wellbore to produce a dry flare gas;
   a combustion generator configured to produce combustion generator electrical power and combustion generator heat by combusting at least one portion of the dry flare gas or a derivative thereof and configured to provide the combustion generator heat to the HES; and
   a thermodynamic cycle generator including a generator working fluid and configured to produce thermodynamic cycle electrical power, and wherein the generator working fluid receives heat from the HES; and
   a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy.

2. The system of claim 1, wherein the thermodynamic cycle generator receives coolth from the CES.

3. The system of claim 1, wherein the thermodynamic cycle generator is an organic Rankine cycle (ORC) generator or a Kalina cycle generator.

4. The system of claim 1, further comprising:
   a first generator working fluid conduit configured to flow generator working fluid from the thermodynamic cycle generator to the solar thermal collector; and
   a second generator working fluid conduit configured to flow hot generator working fluid from the solar thermal collector to the thermodynamic cycle generator.

5. The system of claim 4, wherein the system is selectively operable in a first mode in which the HES heats the generator working fluid and in a second mode in which a solar thermal collector directly heats the generator working fluid.

6. The system of claim 1, further comprising a heat exchanger in thermal communication with a flare gas conduit before the extraction condenser configured to condense water from the flare gas stream, wherein the heat exchanger is configured to receive coolth from the CES.

7. The system of claim 1, wherein the combustion generator heat superheats the generator working fluid at a superheat heat exchanger.

8. The system of claim 1, wherein one or more of the combustion generator and the thermodynamic cycle generator are in electrical communication with a regional power grid and are configured to transfer at least a portion of electrical power produced by the one or more of the combustion generator and the thermodynamic cycle generator to the regional power grid.

9. The system of claim 1, further comprising a chiller that receives electrical power from one or more power sources and cools the CES.

10. The system of claim 9, further comprising:
    a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy,
    wherein the one or more power sources include the PV module.

11. A system for providing electrical power, the system comprising:
    a hot energy storage (HES);
    a cold energy storage (CES);
    an extraction condenser, wherein the extraction condenser receives coolth from the CES and is configured to condense at least a portion of a flare gas stream exiting a wellbore to produce a dry flare gas;
    a combustion generator configured to produce combustion generator electrical power and combustion generator heat by combusting at least one portion of the dry flare gas or a derivative thereof and configured to provide the combustion generator heat to the HES; and
    a thermodynamic cycle generator including a generator working fluid and configured to produce thermodynamic cycle electrical power, and wherein the generator working fluid receives heat from the HES, and
    a chiller that receives electrical power from one or more power sources and cools the CES, wherein the one or more power sources includes the combustion generator.

12. The system of claim 11, further comprising:
    a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy,
    wherein the one or more power sources include the PV module.

13. The system of claim 11, further comprising a heat exchanger in thermal communication with a flare gas conduit before the extraction condenser configured to condense water from the flare gas stream, wherein the heat exchanger is configured to receive coolth from the CES.

14. The system of claim 11, wherein the combustion generator heat superheats the generator working fluid at a superheat heat exchanger.

15. The system of claim 11, wherein one or more of the combustion generator and the thermodynamic cycle generator are in electrical communication with a regional power grid and are configured to transfer at least a portion of electrical power produced by the one or more of the combustion generator and the thermodynamic cycle generator to the regional power grid.

16. The system of claim 11, wherein the thermodynamic cycle generator receives coolth from the CES.

17. The system of claim 11, wherein the thermodynamic cycle generator is an organic Rankine cycle (ORC) generator or a Kalina cycle generator.

18. The system of claim 11, further comprising a solar thermal collector in thermal communication with the HES to heat the HES, wherein the solar thermal collector includes a photovoltaic (PV) module, and the solar thermal collector is configured to convert a first portion of sunlight to thermal energy and a second portion of the sunlight to electrical energy.

19. The system of claim 18, further comprising:
- a first generator working fluid conduit configured to flow generator working fluid from the thermodynamic cycle generator to the solar thermal collector; and
- a second generator working fluid conduit configured to flow hot generator working fluid from the solar thermal collector to the thermodynamic cycle generator.

20. A system for providing electrical power, the system comprising:
- a hot energy storage (HES);
- a cold energy storage (CES);
- a combustion generator configured to produce combustion generator electrical power and combustion generator heat by combusting at least one portion of a dry flare gas or a derivative thereof and configured to provide the combustion generator heat to the HES;
- a chiller configured to receive combustion generator electrical power and cool the CES;
- a thermodynamic cycle generator including a generator working fluid and configured to produce thermodynamic cycle electrical power, wherein the generator working fluid receives heat from the HES and receives coolth from the CES;
- a solar thermal collector including a photovoltaic (PV) module, and the solar thermal collector being configured to convert a first portion of sunlight to solar thermal energy and a second portion of the sunlight to solar electrical energy, wherein the solar thermal collector is in thermal communication with the HES to heat the HES with the solar thermal energy, and the PV module of the solar thermal collector is in electrical communication with the chiller to cool the CES.

* * * * *